June 17, 1941.  T. A. DILLON  2,246,483
VIBRATING APPARATUS
Filed March 12, 1940  4 Sheets-Sheet 1
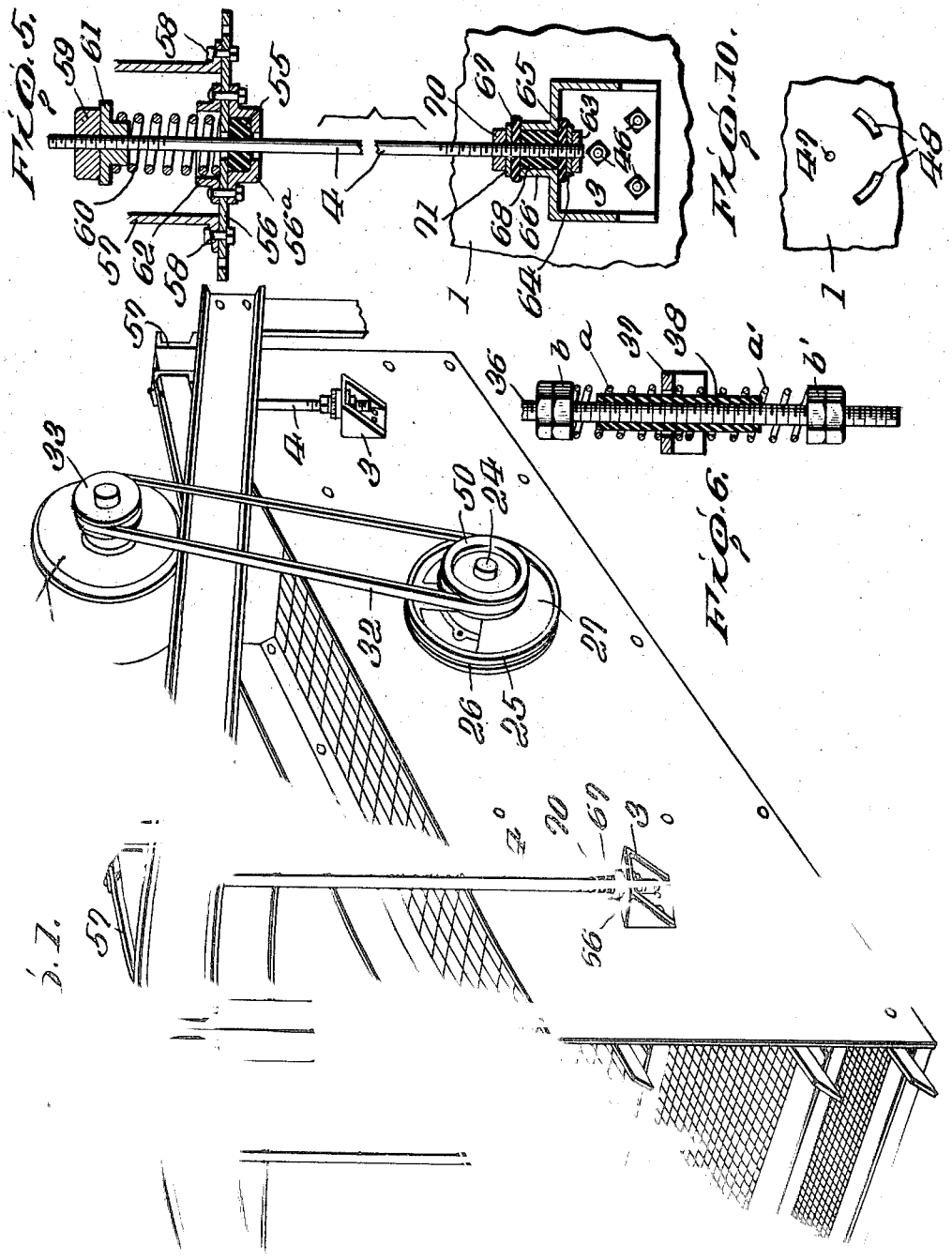

June 17, 1941. T. A. DILLON 2,246,483
VIBRATING APPARATUS
Filed March 12, 1940 4 Sheets-Sheet 3

INVENTOR
Thomas A. Dillon
By
J. Harold Fishis
ATTORNEY

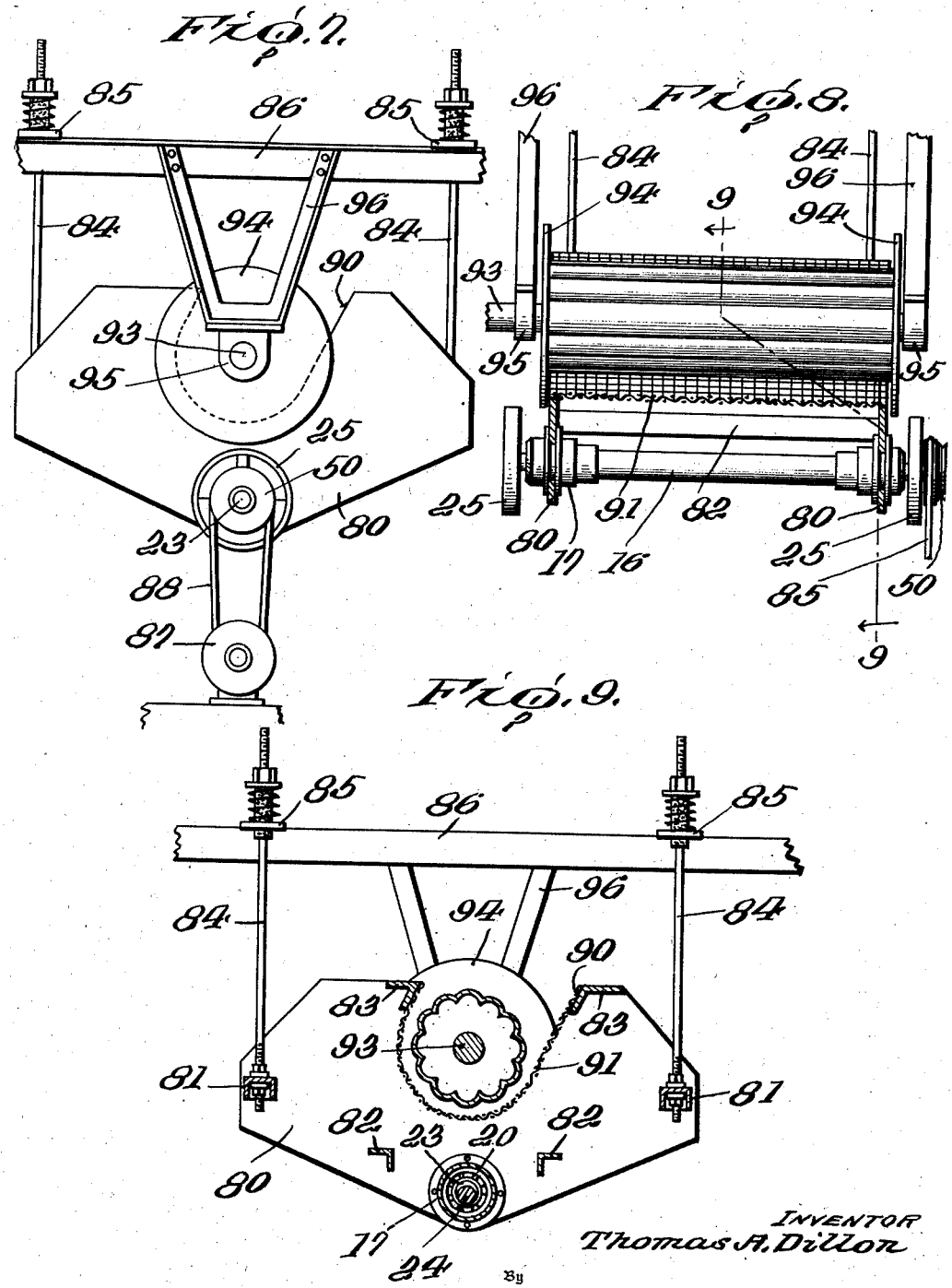

Patented June 17, 1941

2,246,483

UNITED STATES PATENT OFFICE 2,246,483

VIBRATING APPARATUS

Thomas Aloysius Dillon, Toronto, Ontario, Canada, assignor to Dillon Patents Limited, Toronto, Ontario, Canada, a corporation of Canada Application March 12, 1940, Serial No. 323,626

10 Claims. (Cl. 209—326)

The present invention relates to a high speed vibrating device in which the vibratable structure constitutes a system which is in both static and dynamic balance about an axis extending substantially through the center of gravity of the vibratable structure.

This application is a continuation-in-part of my copending application Serial No. 137,740, filed April 19, 1937.

The invention consists, in general, of a vibratable structure and a supporting system. The vibratable structure includes an element to be vibrated, having bearings located on an axis perpendicular to the plane of desired movement of the element and substantially at the center of mass of the vibratable structure. A rotatable member is journalled in and carried solely by said bearings, the shaft and bearings cooperating in such a manner that the bearing axis is spaced apart from the parallel central axis of the mass of said rotatable member. Driving means are provided on the rotatable member which are concentric to the central axis thereof and adapted to rotate said member, thereby imparting high frequency vibration to the vibratable element.

The supporting means are effective for restricting the movement of the vibratable structure in various directions while permitting substantially unconstrained movements through limited distances in a plane, the supporting means and vibratable structure being so devised as to have a lower natural period of vibration than the enforced period imposed upon the vibratable structure from a driving agency.

One of the principal features of my invention resides in the novel vibratable structure which is capable of being vibrated at high speed while the axis of the rotating system remains sensibly at rest during its spinning and while acting upon the vibratable frame to cause the same to move in a circular orbit.

Another feature of the invention resides in the manner in which the vibratable structure is elastically supported in such a way that the vibratable element and its attaching mechanism is in effect a free body and forms a system having a low natural period of vibration.

Further features of the invention reside in the incorporation of the vibrating structure into various devices suitable for commercial application of the principles involved, such as vibrating screens for sizing and classifying all types of materials and other forms of mechanical vibrators.

With the foregoing and other features as objects in view, as will appear in the course of the following specification and claims, illustrative forms of practicing the invention are set forth in the accompanying drawings, in which:

Figure 1 is a perspective view illustrating the employment of the invention in a vibrating screen.

Figure 2 is a longitudinal sectional view through the rotatable energizing member employed in Fig. 1.

Figure 5 is a detail view showing spring and cushion supporting devices employed in Fig. 1.

Figure 6 is a corresponding view of the supporting devices employed in Fig. 3.

Figure 7 is a side elevation showing the employment of the invention in a crushing apparatus.

Figure 8 is an end view of the same.

Figure 9 is a vertical sectional view substantially on line 9—9 of Fig. 8.

Figure 10 is a detail showing devices for regulating the screen angle in Fig. 5.

Figure 3:
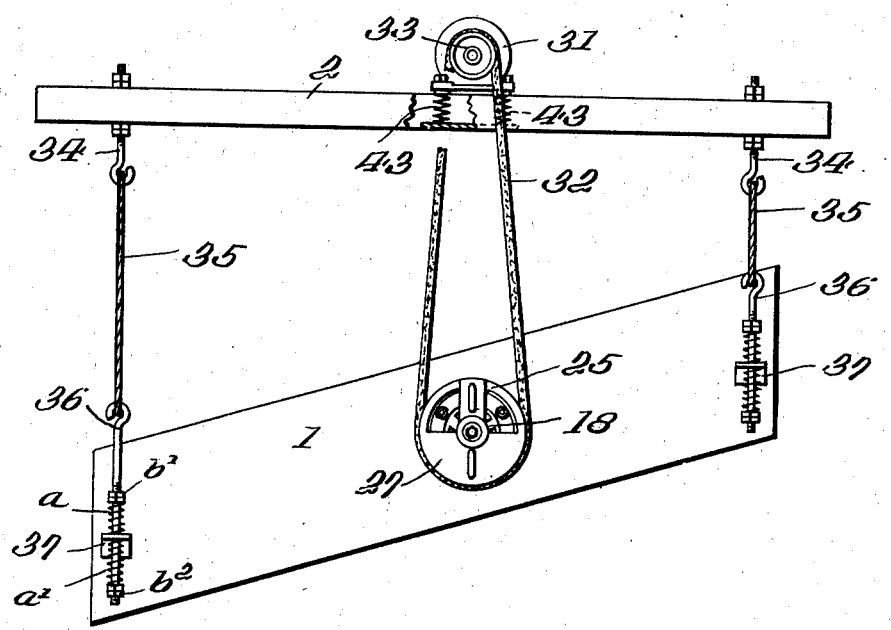
Figures 3 and 4 are side elevations of modified forms of suspension for a vibrating screen.
Figure 4:
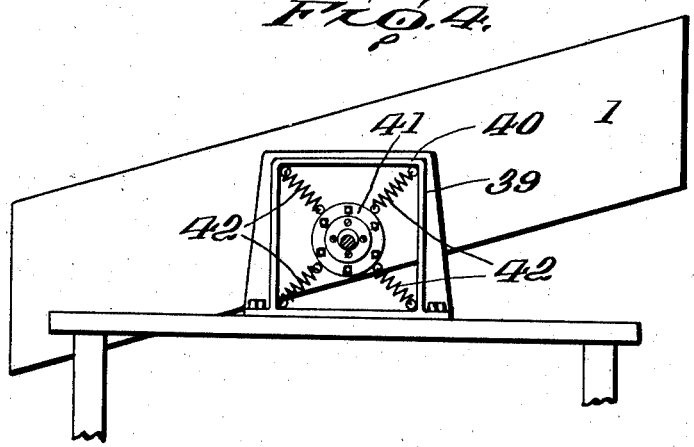

In the embodiment of my invention illustrated in Fig. 1, the vibrating structure comprises a vibrating screen which is supported from a suitable support such as the fixed frame 2, at a suitable inclination to the horizontal, by means of rods 4. The lower ends of rods 4 are secured to brackets 3 provided on the sides 1 of the screen frame. The upper ends of rods 4 are resiliently secured to the cross members of the fixed frame 2 in such a manner as to permit substantially unconstrained vibratory movement of the screen frame in a circular orbit, as shall be described in detail hereafter.

To set up the required vibrating, shaking, or gyratory movement of the screen, I provide a shaft 15 which extends transversely of the frame 1 and is contained within a housing 16 extending across the frame from one side to the other. The housing 16 extends between a pair of bearing housings 17 carried upon the inner faces of the sides of the frame 1 and surrounding orifices in such sides through which the end portions of the snaft project. The outer faces of the sides of the frame 1 carry the outer portions 18 of the bearing housings, and the assemblies are secured together by bolts 19 which pass through the portions 17 and 18 and also through the sides of the frame 1. Roller bearings 20 are positioned within the bearing housings to receive the shaft 15, and the outer portions 18 of the bearing housings are provided with the usual dust cap assemblies 21.

56 are formed with upwardly extending collars 62 which surround the springs 60. The collars 61 and 62 retain the springs 60 in their proper alignment surrounding the corresponding rod 4.

The lower ends of the rods 4 which project through the brackets 3 are also threaded to receive nuts 63. The nuts 63 bear against washers 64 which in turn bear against rubber washers 65 positioned to rest against the lower faces of brackets 3. The rods 4 extend through orifices 66 in the brackets 3 and are sheathed within rubber sleeves 67 contained within collars 68 formed on the upper faces of the brackets. The tops of the collars 68 and of the rubber sleeves 67 support upper rubber washers 69 and the rods 4 also carry nuts 70 which are threaded on the rods 4 above the brackets 3 to press the washers 71 against the rubber washers 69.

The modification of my invention illustrated in Figs. 7, 8 and 9 is particularly applicable for crumbling or breaking up granular material that is in the form of lumps, such as lumps of lime, salt, clay, etc. The apparatus comprises a vibrating structure formed of two side plates 80 corresponding to the sides of the screen frame 1 in Figure 1, and connected by suitable cross-bars 81, 82 and 83 and also having a vibration imparting assembly, illustrated as identical with that in Figure 2, extending between the plates. The vibrating structure is suspended upon four hanger rod assemblies 84 similar to that shown in Fig. 5. The spring assemblies at the upper ends of the rods are carried upon plates 85 secured to horizontal channel members 86 which are fixedly supported in any suitable manner, and the lower ends of the rod assemblies are attached to the cross-bars or channels 81 extending between the plates 80. The vibrating mechanism is rotated by a motor 87 through drive belt 88 which engages the driven pulley 50 of the mechanism.

The upper portions of the plates 80 are formed with downwardly inclined cutaway U-shaped portions 90, the cutaway portion in one plate registering with the cutaway portion in the other plate. The edges of the cutaway portions carry a screen mesh extending across the assembly from one side plate 80 to the other whereby a trough screen 91 is formed.

The trough screen contains a crushing roller 92 such roller being of a length substantially the same as the length of the trough screen 91 and carried upon a central shaft 93. The ends of the roller 92 are formed with flanges 94 which are of greater diameter than the width of the trough screen and are positioned close to the outer faces of the side plates 80. The shaft 93 is independently rotated from a suitable source of power and also suitably mounted. In the drawings, the shaft is illustrated as carried within a pair of bearing blocks 95 mounted upon the lower ends of V-shaped brackets 96 depending from the horizontal channel members 86. It will thus be understood that, while the trough screen assembly vibrates, the roller 92 does not vibrate but rotates independently of the vibrating assembly. The outer face of the roller 92 can be of any suitable form and in the drawings it is shown corrugated. In many cases, it is advantageous to coat the face of the corrugated roller with rubber to obtain the best results.

The lumpy material to be broken up is fed into the right-hand side (Figs. 7 and 9) of the trough screen as illustrated, and the roller 92 is rotated in a clockwise direction. It will be appreciated that as the lumps of material enter the space between the rotated corrugated roller 92 and the vibrating trough screen, they will be quickly broken up and when reduced to granules will fall through the screen 91 to be received in any suitable receptacle positioned underneath the apparatus. If it is desired to alter the distance between the bottom of the roller and the bottom of the trough screen, this adjustment can be effected by alteration of the position of the nuts upon the rod assemblies 84, whereby the vibrating portion of the crushing apparatus can be moved upwardly or downwardly.

Although the material crushing apparatus as illustrated in Figs. 7, 8 and 9 is shown as designed for breaking up or crumbling friable material, the apparatus can be designed and built for crushing hard, rock-like material. In the case of providing a more rugged type of machine for this class of work, the screen mesh can be formed by a plurality of transverse, spaced-apart bars which would extend from the cutaway portion of one plate 80 to the cutaway portion of the other plate 80. Such relatively thick and heavy bars form a stout grating; and for extra duty, the bars may be of oval or pear-shaped cross-section and so positioned that their major axes substantially point towards the center of the crushing roller 92. The crushing roller 92 is made of an appropriate weight of construction and preferably formed of a hard alloy such as manganese steel.

In operation of the various forms, the rate of revolution of the rotatable member is sufficiently high as to be well above the resonant or critical frequency of the system comprised of the vibratable structure and the supporting means, with the result that the vibratable structure moves under the control of the forces set up by the rotatable member, and under very small control by the supporting means: it behaves thus as a free body because of the small influence of the supporting means on its motion.

The proportioning of the masses attached to the rotatable member is such that the combination of the rotatable member and the vibratable structure have their combined mass center at the geometrical axis of the rotatable member. Due, however, to the bearing between the rotatable member and the vibratable structure, the entire mass of the vibratable structure has an effect as though it were concentrated on the bearing axis, and it makes no contribution to the moment of inertia of the rotatable structure.

When the rotatable member is accelerated to operating speed, it passes through the resonance frequency quickly, after which, as the speed exceeds the resonance frequency, the vibratable structure including the rotatable member begins to behave as a free body. That is, it rotates about its mass axis, or the geometrical axis of the rotatable structure. Under these circumstances, the vibratable structure describes an orbital motion, with radius equal to the eccentricity of the bearing surfaces. With the rotatable member near the center of gravity of the vibratable structure, the entire vibratable structure describes this orbital motion, with no superimposed rotation. If the rotatable structure is attached at some distance from the mass center, there is superimposed, upon the orbital motion, a rotation which causes the vibratable structure to move in non-circular orbits at points remote from the rotatable member.

Varying loads are applied to the vibratable structure while in operation. These loads have a very minor influence on the position of the mass center of the system comprised of the vibratable structure and the rotatable member. When the invention is used for screening purposes, the loose material is only in contact with the vibratable structure for a small part of the orbit and appears visually to be floating above it. During this very short time the influence of the weight of the charge has a negligible effect on the position of the axis.

When the loads are frictional or otherwise applied throughout the whole orbit, they may be compensated for by the design of the balancing masses on the rotatable structure.

The system, comprised of the screen and other attendant framework, the shaft, and the eccentric weights moves as though the screen were concentrated as a mass at the center of their respective bearings, this mass having no moment of inertia. By proportioning the weights in the flywheels correctly, the mass center of the entire system is made to coincide with the geometrical axis of the shaft, with the result that the shaft remains sensibly at rest while it spins, and a concentric pulley may be used on this shaft without danger to the belts at very low frequencies. As the load is applied to the screen, the load rests on the screen and increases its apparent mass. This will move the dynamical axis of rotation away from the geometrical center of the shaft. However, as the speed of rotation is increased to the point where the material on the screen remains suspended in space above the screen, the influence of the weight of the charge on the mass of the screen structure becomes smaller until at high speed the weight of the charge has a negligible effect on the screen mass. This causes the axis of rotation to return to the geometrical center of the shaft. The contact of the screen with the charge is such that the charge will be propelled slowly in a horizontal direction along the screen. Thus, the screen may be used as a conveyor when its position is substantially horizontal. When the screen is inclined as in Fig. 1, it is preferred to have the direction of rotation of the rotatable member such that its upper surface is turning in a relatively uphill direction, and thus the relative advancement of the charge by the action of the screen is countercurrent to the downward flow of material therealong; and the time of contact of the material with the screen is thereby increased, with the resultant high screening efficiency of the system.

It will be understood that the illustrative forms are not restrictive, and that the invention may be practiced in many ways within the scope of the appended claims.

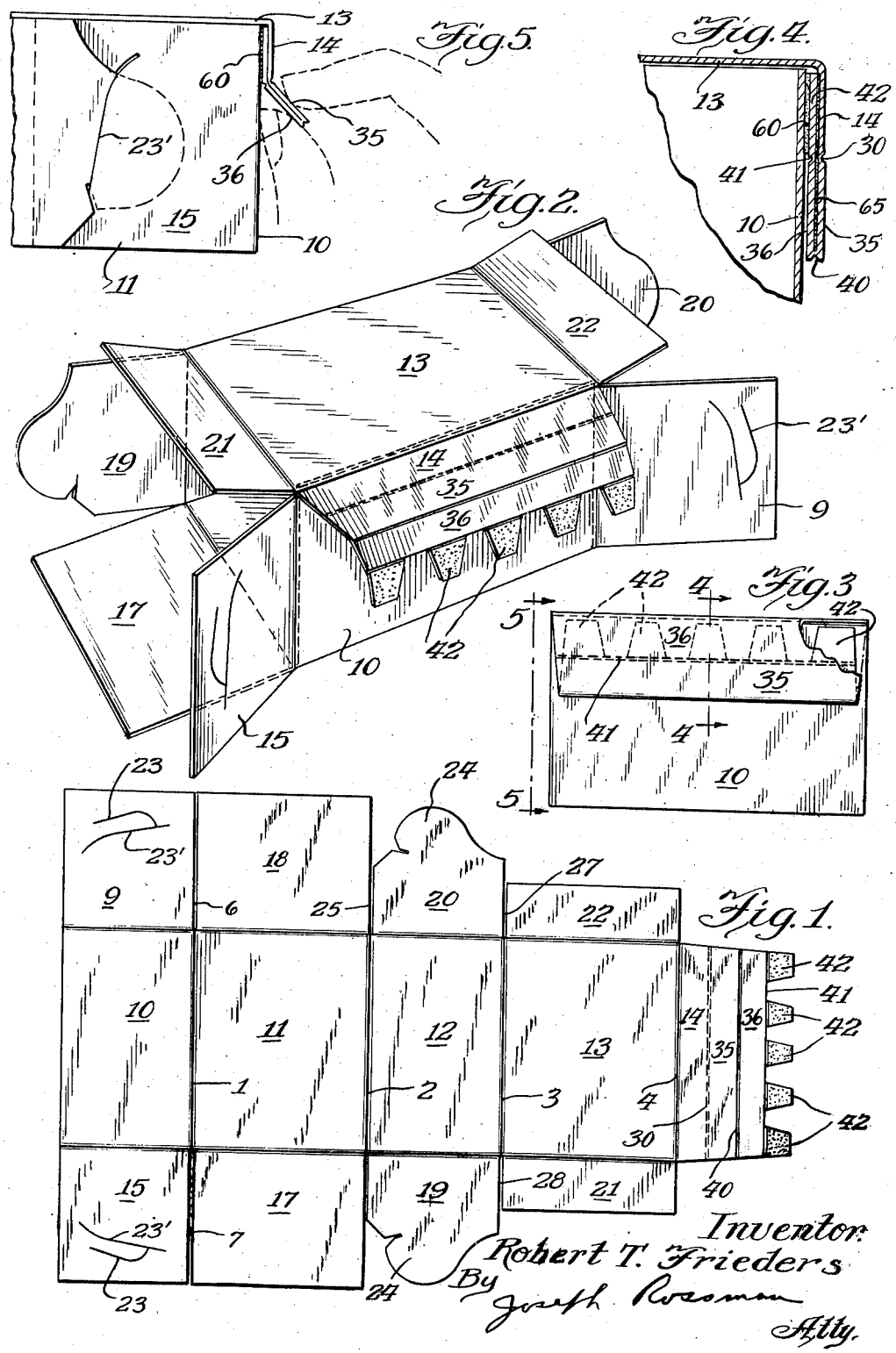

I claim:

1. In a screening apparatus, a vibrating screen supporting frame, a resilient support for said frame, said support being yieldable in all directions in a vertical plane extending longitudinally of said screen, bearings carried by said screen supporting frame, a rotatable transverse shaft journalled in said bearings and carreid solely by the screen supporting frame, said shaft being provided with eccentric portions journalled in said bearings and outer portions extending from said bearings concentric to the portion between said eccentric portions and a driven pulley mounted on one of said outer portions, said shaft and pulley being so proportioned that when the shaft is rotated at its normal operative speed, the axis of rotation will coincide with the geometrical axis of said pulley.

2. In a screening apparatus, a vibrating screen supporting frame, resilient means supporting said frame, said support being yieldable in all directions in a vertical plane extending longitudinally of said screen, bearings carried by said screen supporting frame, a rotatable transverse shaft journalled in said bearings and carried solely by the screen supporting frame, said shaft being provided with eccentric portions journalled in said bearings and outer portions extending from said bearings concentric to the portion between said eccentric portions, a driven pulley mounted on one of said outer portions, said shaft and pulley being so proportioned that when the shaft is rotated at its normal operative speed, the axis of rotation will coincide with the geometrical axis of said pulley, and driving means mounted independently of the screen supporting frame and flexibly connected to said driven pulley.

3. In a screening apparatus, a vibrating screen supporting frame, a resilient support for said frame, said support being yieldable in all directions in a vertical plane extending longitudinally of said screen, bearings carried by said screen supporting frame, a rotatable transverse shaft journalled in said bearings and carried solely by the screen supporting frame, said shaft having two spaced apart eccentric portions journalled in said bearings and outer portions extending from said bearings concentric to the portion between said eccentric portions, a driven pulley mounted on one of said outer portions, counterbalancing flywheels carried upon each of the outer portions of said shaft, said shaft, pulley, and flywheels being so proportioned that when the shaft is rotated at its normal operative speed, the axis of rotation will coincide with the geometrical axis of said pulley.

4. In a screening apparatus, a vibrating screen supporting frame and a stationary frame, a plurality of resilient elements securing said screen supporting frame to said stationary frame, said resilient elements being yieldable in all directions in a vertical plane extending longitudinally of said screen, a pair of bearings carried by the sides of said screen supporting frame, a rotatable transverse shaft journalled in said bearings and carried solely by the screen supporting frame, said shaft being provided with eccentric portions journalled in said bearings and outer portions extending from said bearings concentric to the portion between said eccentric portions, a driven pulley mounted on one of said outer portions, a counterbalancing flywheel carried upon each of the outer portions of said shaft, said shaft, pulley and flywheels being so proportioned that when the shaft is rotated at its normal operative speed, the axis of rotation will coincide with the geometrical axis of said pulley, and driving means mounted independently of the screen supporting frame and flexibly connected to said driven pulley.

5. In a screening apparatus, a vibrating screen supporting frame, a stationary frame, a plurality of resilient elements securing said screen supporting frame to said stationary frame and carrying said screen supporting frame in resilient floating relation thereto, said resilient elements being yieldable in all directions in a vertical plane extending longitudinally of said screen, a pair of bearings carried by the sides of said screen supporting frame, a rotatable transverse shaft journalled in said bearings and carried solely by the screen supporting frame, said shaft being provided with eccentric portions journalled in said bearings and outer portions extending from said bearings concentric to the portion between said eccentric portions and a driven pulley mounted on one of said outer portions, said shaft and pulley being so proportioned that when the shaft is rotated at its normal operative speed, the axis of rotation will coincide with the geometrical axis of said pulley.

6. In a screening apparatus, a vibrating screen supporting frame, a stationary frame, a plurality of resilient elements securing said screen supporting frame to said stationary frame and carrying said screen supporting frame in resilient floating relation thereto, said resilient elements being yieldable in all directions in a vertical plane extending longitudinally of said screen, a pair of bearings carried by the sides of said screen supporting frame, a rotatable transverse shaft journalled in said bearings and carried solely by the screen supporting frame, said shaft being provided with eccentric portions journalled in said bearings and outer portions extending from said bearings concentric to the portion between said eccentric portions, a driven pulley mounted on one of said outer portions, a counter-balancing flywheel carried upon each of the outer portions of said shaft, said shaft, pulley and flywheels being so proportioned that when the shaft is rotated at its normal operative speed, the axis of rotation will coincide with the geometrical axis of said pulley, and driving means mounted independently of the screen supporting frame and flexibly connected to said driven pulley.

7. In a vibrating apparatus, a vibrating frame, a resilient support for said frame, said support being yieldable in all directions in a vertical plane extending longitudinally of said frame, bearings carried by said frame, a rotatable transverse shaft journalled in said bearings and carried solely by the frame, said shaft being provided with eccentrics journalled in said bearings and outer portions extending from said bearings substantially concentric to the portion between said eccentrics and a driven pulley mounted on one of said outer portions, said shaft and pulley being so proportioned that when the shaft is rotated at normal operative speed, the axis of rotation will coincide with the geometrical axis of said pulley.

8. In a vibrating apparatus, a vibrating frame, a resilient support for said frame, said support being yieldable in all directions in a vertical plane extending longitudinally of said frame, bearings carried by said frame, a rotatable transverse shaft journalled in said bearings and carried solely by the frame, said shaft having two spaced apart eccentric portions journalled in said bearings and outer portions extending from said bearings, the portion of said shaft between said bearings being substantially concentric with said outer portions, a driven member of circular section concentrically mounted upon one of said outer portions for driving the shaft, counterbalancing flywheels carried upon each of the outer portions of said shaft, said shaft, driven member and flywheels being so proportioned that when the shaft is rotated at its normal operative speed, the axis of rotation will coincide with the geometrical axis of said driven member and said outer portions.

9. In a vibrating apparatus, a vibrating frame, a stationary frame, a plurality of resilient elements securing said vibrating frame to said stationary frame and carrying the vibrating frame in resilient floating relation thereto, said resilient elements being yieldable in all directions in a vertical plane extending longitudinally of said vibrating frame, a pair of bearings carried by the sides of said vibrating frame, a rotatable transverse shaft journalled in said bearings and carried solely by the vibrating frame, said shaft being provided with eccentric portions journalled in said bearings and outer portions extending from said bearings, the portion of said shaft between said bearings being substantially concentric with said outer portions, a driven member of circular section concentrically mounted upon one of said outer portions for driving the shaft, a counterbalancing flywheel carried upon each of the outer portions of said shaft, said shaft, driven member and flywheels being so proportioned that when the shaft is rotated at its normal operative speed, the axis of rotation will coincide with the geometrical axis of said driven member and said outer portions, and driving means mounted independently of the vibrating frame and flexibly connected to said driven member.

10. In a vibrating apparatus, a vibrating frame, a resilient support for said frame, said support being yieldable in all directions in a vertical plane extending longitudinally of said frame, bearings carried by said frame, a rotatable system including outer shaft portions extending from said bearings, a shaft portion between said bearings which is substantially concentric with said outer portions, two transversely spaced eccentric portions rotatably supported by said bearings so that the system is carried solely by the frame, a driven member of circular section concentrically mounted upon one of said outer portions for driving the system, and counterbalancing flywheels carried upon each of the outer portions, said rotatable system being so proportioned that when it is rotated at its normal operative speed, the axis of rotation will coincide with the geometrical axis of said driven member and said outer portions.

THOMAS ALOYSIUS DILLON.